UNITED STATES PATENT OFFICE.

AMERICAN WATER PROOF CLOTH COMPANY, OF BROOKLYN, NEW YORK, ASSIGNEES, BY MESNE ASSIGNMENTS, OF J. F. GREENE.

IMPROVEMENT IN OBTAINING FIBERS FROM WASTE FELTED FABRICS.

Specification forming part of Letters Patent No. 23,642, dated April 12, 1859; Reissue No. 2,086, dated October 10, 1865.

*To all whom it may concern:*

Be it known that JOHN F. GREENE, of Brooklyn, in the State of New York, invented a new and improved process for obtaining fibers from waste and refuse felted fabric in suitable condition for being worked into felt and other fabrics, for which invention Letters Patent were issued to Samuel Boyd Tobey, as assignee of said GREENE, on the 12th day of April, A. D. 1859, and which Letters Patent have become the property of the American Water Proof Cloth Company, and have been surrendered by the said company, an account of a defective specification, and the said company ask for a reissue of said Letters Patent upon the following amended specification and claims; and said company hereby declare that the following is a full, clear, and exact description thereof.

Many attempts have been made to disintegrate felted fabrics of fur and of wool, so as to obtain from old and worn felts, and from the clippings produced in the manufacture of hats and other felts, the fibers in a condition suitable for being used as a part of the stock in the manufacture of felted and other fabrics; but prior to the invention of said GREENE all such attempts have been unsuccessful, for the reason that in tearing apart such old or waste felts the fibers were so completely broken and destroyed as to be of no value in the production of other fabrics.

The object of said invention is so to disintegrate old felts and the clippings of new felts, or felts which for any cause are of little or no use in the arts, that the fibers thereof may be obtained in a suitable condition to be employed to advantage in admixture with new fibers in the manufacture of felted or other fabrics, whether of wool or fur; and to this end the said invention consists in subjecting the felts which are to be disintegrated to the action of steam, preparatory to and in combination with the action of suitable machinery for picking it and tearing it apart, to separate the fibers from each other, the action of steam on such fabrics having the effect, as was discovered by said GREENE, of loosening that hold or interlocking which the several fibers have, and which was produced in the original formation of the fabric by what is known as the "felting" action, so that when so loosened or unlocked, the fibers can be separated by the mechanical action of a picker.

If the felts to be disintegrated consist of the clippings produced in the manufacture of hats are of old hats or other felts which have been laid over or saturated with shellac or other mastic cement or glue, they are first to be steeped in a solution of sal-soda until the gum, resin, or other cement is thoroughly extracted. The solution is made by taking fifty pounds of sal-soda to three hundred pounds of stock, to be treated and dissolved, to be put in three hundred and twenty gallons of water. The felts are boiled in this solution from half to one hour, and then are steeped in the said solution without boiling for about three hours. Care should be taken not to boil too long, as that will tend to fix the gum, &c., instead of extracting it. After steeping the required length of time, the liquor should be drawn off and the felts steeped in clear water and dried; but if the felts have not been coated or saturated with any like cementing substance, it will not be necessary to treat them in this manner. The felts to be disintegrated should then be steamed, so that the steam shall thoroughly penetrate them, and while so saturated they should be subjected to the action of some suitable picker, by which the fibers are pulled apart, which will be done with comparative ease so long as they are steamed. After the fibers are delivered from the picker, they are to be passed through a suitable cleaning-machine to be sorted—that is to say, the fibers which are entirely free from others are to be separated from the lump consisting of an aggregation of numerous fibers, which lumps are then to be again subjected to the operation of the picker and cleaner; and although the said use of the said invention is not to the use of a steaming and picking apparatus or machine, or to a cleaner of any special construction, nevertheless the use is preferred of machinery constructed substantially in accordance with the description and drawings making part of the application of said GREENE for other Letters Patent of even date with the original Letters Patent, being for a machine for tearing up waste and refuse felted fabrics, and the other an improved cleaner for seperating the fibers from disintegrated lumps and impurities.

What is claimed as the invention of said GREENE, and desired to secure by Letters Patent, is—

1. Subjecting the felts to be disintegrated to the successive and combined action of steam and picking, substantially as described, the steam having the effect either to unfelt or so loosen the hold which the fibers have on each other in felted fabrics that they can be drawn apart of sufficient length to be advantageously employed in the manufacture of other felts or other fabrics.

2. Subjecting the felts which are to be disintegrated to the action of steam for the purpose of loosening the fibers preparatory to the action of the machinery, as hereinbefore described.

3. The application of sal-soda, or other equivalent chemical agent, in solution, with heat, for the purpose of extracting the glue, mastic cement, or gums from the felts, in the manner hereinbefore described.

AMERICAN WATER PROOF CLOTH CO.,
By WM. B. FOBEY,
*Treasurer.*

Witnesses:
S. B. TOBEY, JR.,
WM. PORTER.